United States Patent [19]
Doyle

[11] Patent Number: 6,146,084
[45] Date of Patent: Nov. 14, 2000

[54] AUTOMATED BUNDLING AND STACKING OF FOLDED CORRUGATED BOXES

[75] Inventor: Walter Vernon Doyle, High Point, N.C.

[73] Assignee: W. V. Doyle Enterprises, Inc., High Point, N.C.

[21] Appl. No.: 09/003,899

[22] Filed: Jan. 7, 1998

[51] Int. Cl.[7] .................................................. B65G 57/09
[52] U.S. Cl. .................. 414/788.9; 414/790; 414/794.3; 414/794.4; 414/802; 414/907
[58] Field of Search ................................ 414/788.9, 790, 414/790.1, 790.9, 790.6, 791, 794.3, 794.4, 802; 904/907; 493/144

[56] References Cited

U.S. PATENT DOCUMENTS

| | | | |
|---|---|---|---|
| 3,107,793 | 10/1963 | Frank | 414/791 |
| 3,420,386 | 1/1969 | Morrow et al. | 414/791 X |
| 3,606,310 | 9/1971 | Larson | 414/794.3 X |
| 3,744,649 | 7/1973 | Ward, Jr. . | |
| 3,971,918 | 7/1976 | Saito . | |
| 3,986,621 | 10/1976 | Bowser . | |
| 4,132,321 | 1/1979 | Bowlby et al. . | |
| 4,162,016 | 7/1979 | Schmitt | 414/794.3 |
| 4,195,959 | 4/1980 | Schmitt | 414/794.3 X |
| 4,255,074 | 3/1981 | Meratti et al. | 414/794.3 X |
| 5,217,425 | 6/1993 | Cantrell . | |
| 5,653,574 | 8/1997 | Lin . | |
| 5,656,005 | 8/1997 | Cummings et al. . | |

FOREIGN PATENT DOCUMENTS

| | | | |
|---|---|---|---|
| 0 359 920 | 3/1990 | European Pat. Off. | 414/794.3 |

Primary Examiner—Janice L. Krizek
Attorney, Agent, or Firm—Philip Summa, P.A.

[57] ABSTRACT

A method and apparatus are disclosed for making and stacking bundles of corrugated folded boxes into accurate loads. The method comprises advancing a squared bundle of flattened folded glued corrugated boxes along a conveyor while applying a compressing force to the bundle in a direction that bears against the glued portions of the boxes in the bundle, lowering the squared first discrete bundle from the conveyor onto the upper surface of the lift while maintaining the bundle in its squared orientation, squaring a succeeding discrete bundle of folded glued boxes while the first bundle is on the conveyor or the lift, advancing a succeeding squared bundle along the conveyor to the position above the lift while applying the compressing force to the bundle, lowering the succeeding bundle onto the top of the first bundle while maintaining the succeeding bundle in its squared orientation and while orienting the succeeding bundle to match the first bundle while the first bundle is on the lift to form an aligned stack of both bundles, and discharging the aligned stack from the lift. The apparatus includes a squaring station for receiving individual folded corrugated boxes and squaring the boxes into a bundle, a conveyor for advancing a squared bundle of folded boxes from the squaring station, a lift adjacent the conveyor for successively receiving squared bundles from the conveyor, means for delivering a squared bundle from the conveyor to the lift positioned below the plane of the conveyor, and an exit conveyor for discharging a stack of bundles from the lift.

34 Claims, 10 Drawing Sheets

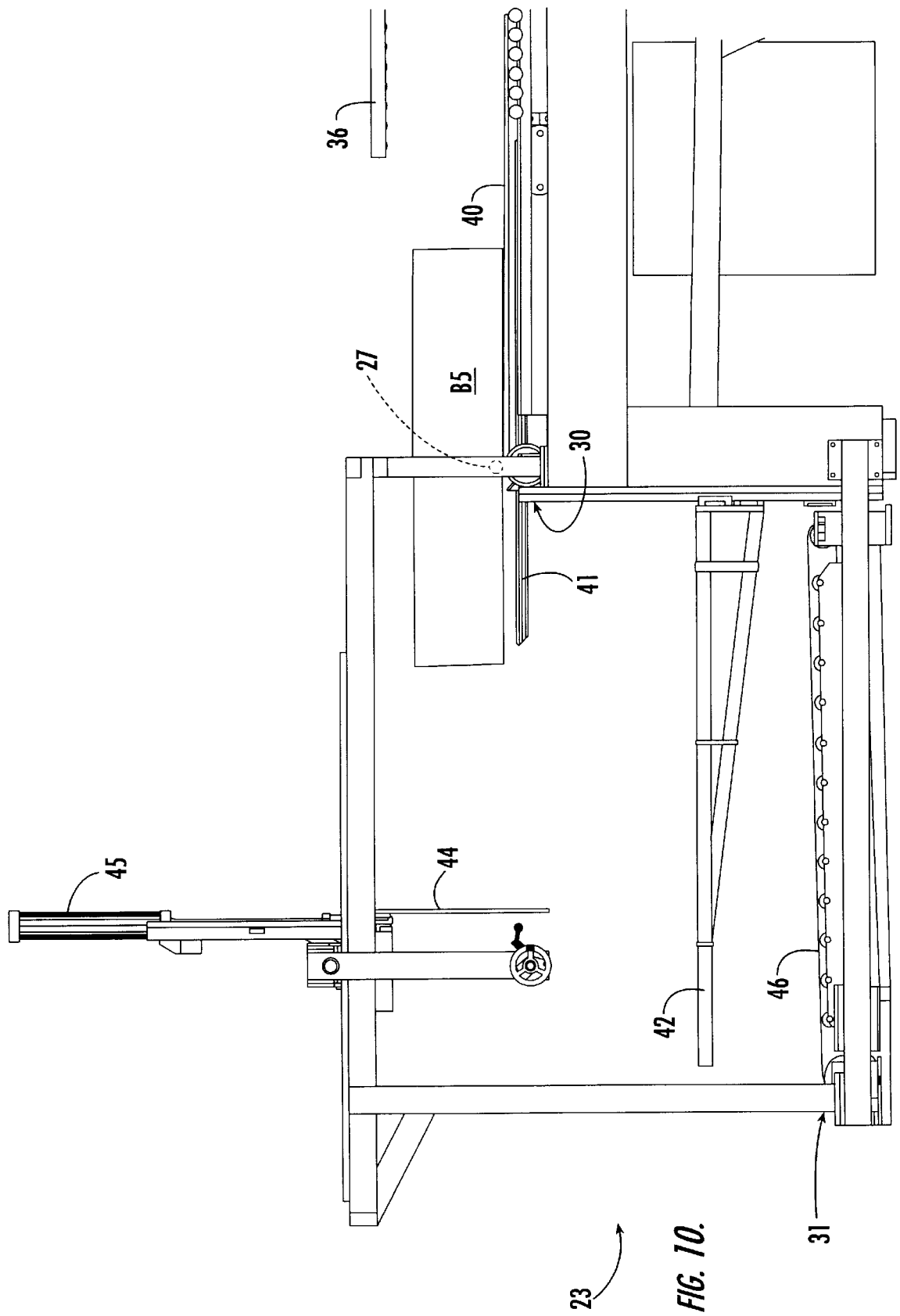

AUTOMATED BUNDLING AND STACKING OF FOLDED CORRUGATED BOXES

FIELD OF THE INVENTION

The present invention relates to the manufacture of boxes from corrugated stock material. In particular, the invention relates to an automated apparatus and method for counting, squaring, bundling, and stacking loads of folded corrugated blank boxes.

BACKGROUND OF THE INVENTION

The present invention relates to manufacturing boxes from corrugated paper stock. As used herein and as well understood in the industry, corrugated stock refers to a paper product that is also commonly (but somewhat erroneously) referred to as "cardboard." More properly, corrugated board is formed from one or more pieces of "fluted" paper, a term that describes paper that has been crimped into a somewhat sinusoidal cross section by an appropriate fluting machine. One or more layers of flat paper typically referred to as "liners" are glued to the fluted layer. Accordingly, many corrugated boxes (as well as corrugated packing inserts and similar structures) are formed of inner and outer liner sheets, with one or more fluting layers in between, and with at least one liner between each fluting layer.

Because corrugated board is typically formed in long running sheets, it must be cut and folded to form boxes. Typically, the corrugated board (which can be referred to as a "blank") is first cut and creased to define the portions that will eventually be folded. The blank is then partially folded and a glue strip is applied to one side to fasten it to an overlapping side. The resulting structure is a flattened parallelogram of corrugated board containing cuts and creases that will later define the sides and flaps of the box, and thus its eventual solid rectangular shape. The folding and gluing operation is usually automated, and carried out by a machine referred to as a "folder-gluer." A printing step is often carried out on the blanks at some point in this process. Because the present invention does not generally relate to printing boxes, the specific details of printing will not be discussed in any further detail herein. Boxes are, however, typically printed, folded, and glued one at a time. Because corrugated boxes are often used in large volumes, these individual flattened boxes must be collected, counted, bundled, and stacked into loads for eventual shipment to an end user, typically in the flattened condition.

Because flattened and glued boxes are so often shipped in large numbers to their end users, they likewise frequently travel in trucks and containers ("container" refers to the widely used metal containers that are approximately the size of a truck trailer, and are often carried as such, but that are also designed to be carried by ships and on railroad cars). When boxes are shipped in this fashion, they are typically stacked into loads that fit efficiently inside a truck or a container. Such loads are frequently about 45" wide because two such loads fit comfortably inside a truck or a container in side-by-side relationship.

Conventionally, the individual folded glued boxes are either automatically stacked on a one-by-one basis or stacked in bundles using a manual technique. Because of their one-by-one nature, such techniques can represent the slow point in an overall box production process. As a result, the counting, bundling, stacking, and load-forming steps often represent the rate-limiting steps in a box production facility. Additionally, the conventional counting and stacking techniques do little to enhance the integrity of the fresh glue joint and in many cases can even weaken the glue joint, thus weakening or even ruining the resulting boxes.

Accordingly, the need exists for an apparatus and associated technique for receiving, counting, bundling, stacking, and forming loads from folded glued box blanks that is as fast as the production and printing steps of the process. Furthermore, because the boxes are most preferably prepared for loading without delay following their manufacture, the process should avoid damaging the glue strip, and a need exists for processes which will enhance the glued structure rather than place stress upon it.

OBJECT AND SUMMARY OF THE INVENTION

Therefore, it is an object of the present invention to provide a method and apparatus for making and stacking bundles of corrugated folded boxes into accurate loads. The invention meets this object with an apparatus and associated method. The method comprises advancing a squared bundle of flattened folded glued corrugated boxes along a conveyor while applying a compressing force to the bundle in a direction that bears against the glued portions of the boxes in the bundle, lowering the squared first discrete bundle from the conveyor onto the upper surface of the lift while maintaining the bundle in its squared orientation, squaring a succeeding discrete bundle of folded glued boxes while the first bundle is on the conveyor or the lift, advancing the succeeding squared bundle along the conveyor to the position above the lift while applying the compressing force to the bundle, lowering the succeeding bundle onto the top of the first bundle while maintaining the succeeding bundle in its squared orientation and while orienting the succeeding bundle to match the first bundle while the first bundle is on the lift to form an aligned stack of both bundles, and discharging the aligned stack from the lift.

In its apparatus aspects, the invention includes a squaring station for receiving individual folded corrugated boxes and squaring the boxes into a bundle, a conveyor for advancing a squared bundle of folded boxes from the squaring station, a lift adjacent the conveyor for successively receiving squared bundles from the conveyor, means for delivering a squared bundle from the conveyor to the lift positioned below the plane of the conveyor, and an exit conveyor for discharging a stack of bundles from the lift.

The foregoing and other objects and advantages of the invention and the manner in which the same are accomplished will become clearer based on the following detailed description taken in conjunction with the accompanying drawings in which:

BRIEF DESCRIPTION OF THE DRAWINGS

FIG. 10 is another side elevational view similar to FIGS. 3–9, and illustrating the movement of the first bundle in a succeeding stack.

DETAILED DESCRIPTION OF THE PREFERRED EMBODIMENTS

Figure 1:
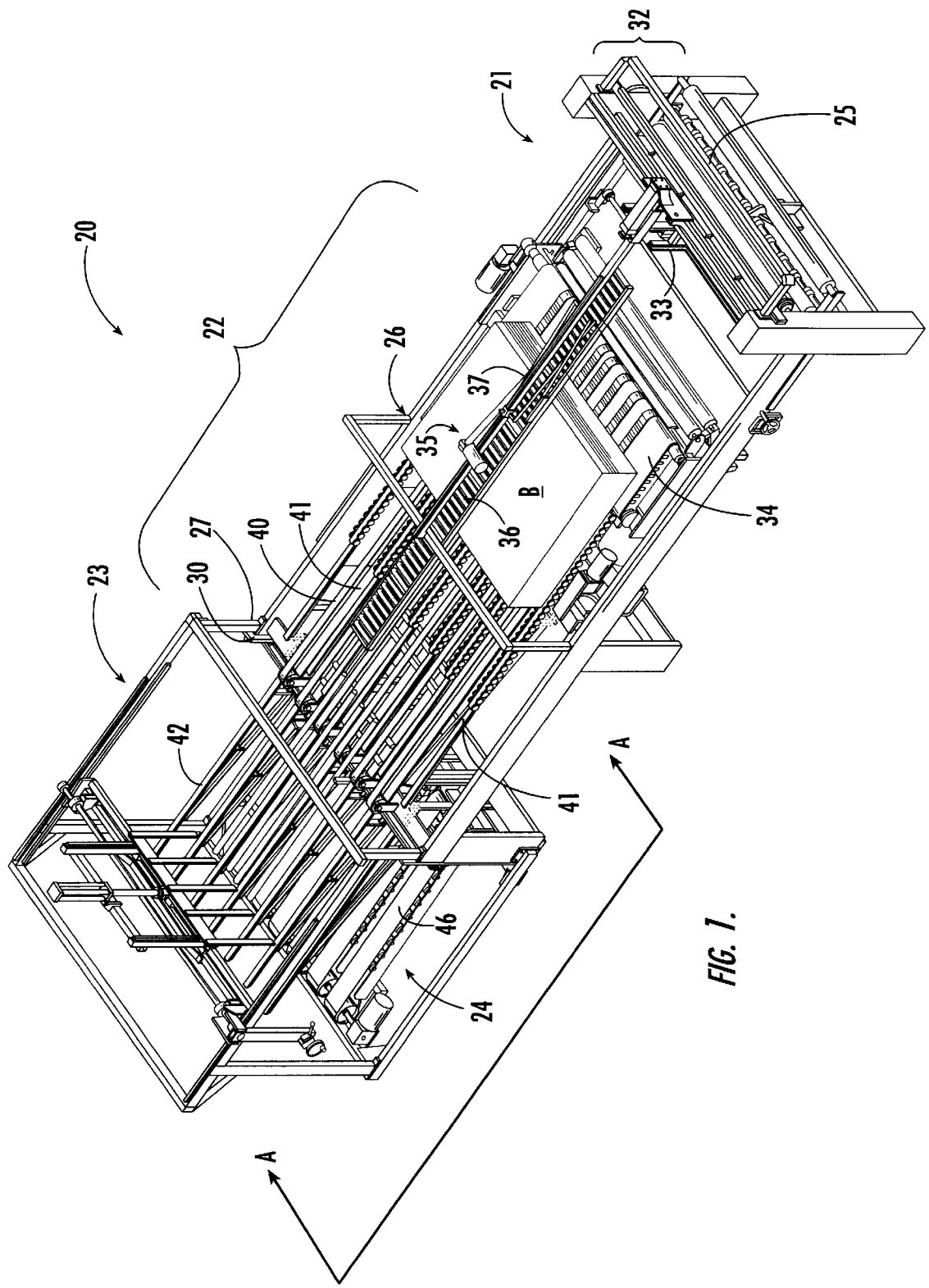
FIG. 1 is a perspective view of an apparatus according to the present invention.

The present invention is an apparatus for automated bundling and stacking of corrugated folded and glued boxes and is broadly designated at 20 in FIG. 1. In its overall parameters, the apparatus comprises a squaring station broadly designated at 21 for receiving individual folded (i.e., flat) corrugated boxes and squaring the boxes into a bundle; a conveyer broadly designated by the bracket 22 for advancing a squared bundle B of folded boxes from the squaring station 21; a lift broadly designated at 23 adjacent the conveyer 22 for successively receiving squared bundles B from the conveyer 22; means for delivering a squared bundle from the conveyer 22 to the lift 23 with the lift positioned below the plane of the conveyer 22; and an exit conveyer broadly designated at 24 for discharging a stack of bundles from the lift.

Figure 9:
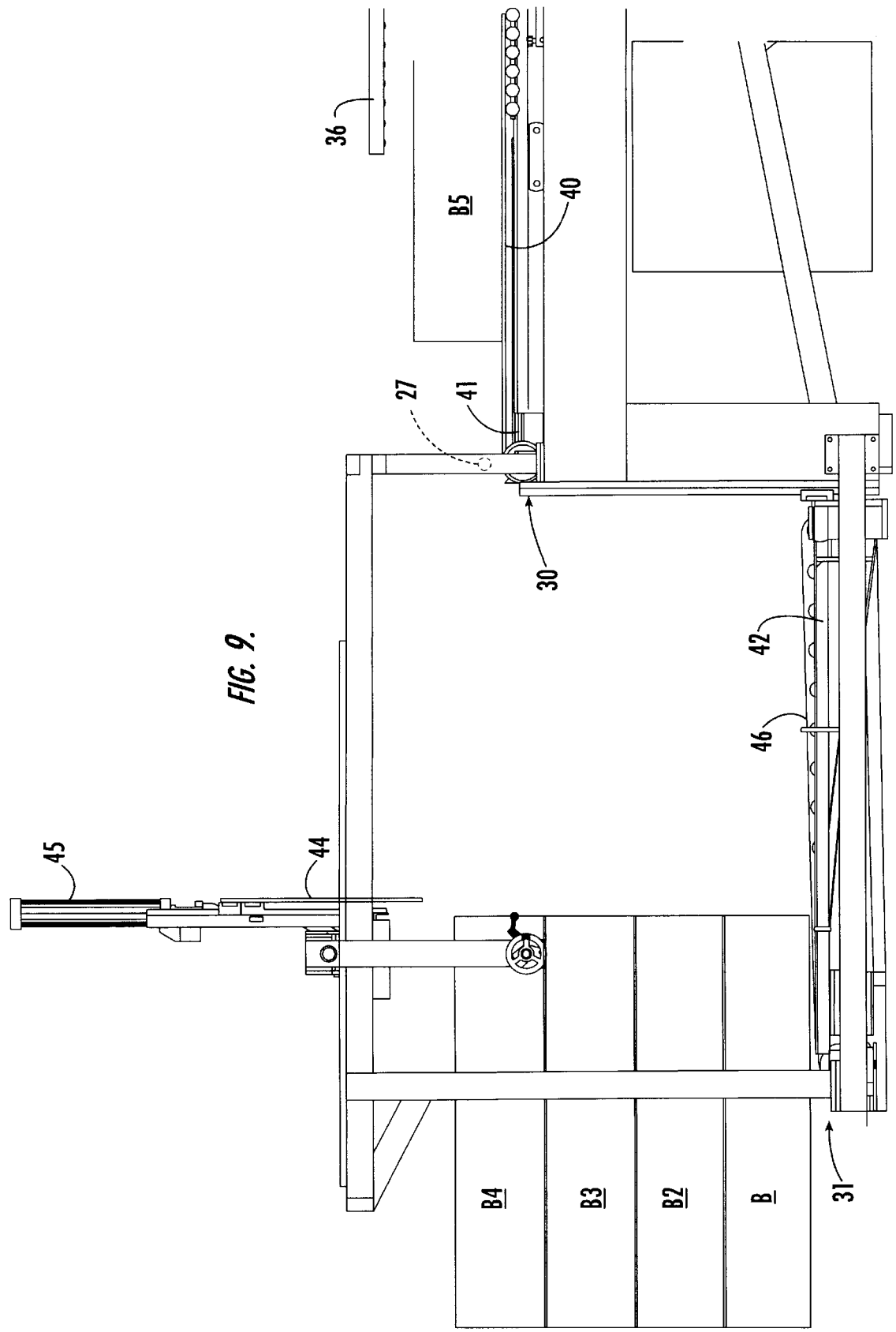

The operation of the invention of the apparatus described herein is enhanced by a plurality of detectors, preferably photodetectors or proximity detectors, that identify the positions of folded glued boxes, bundles of boxes, and stacks of bundles as they progress through the apparatus. Such detectors are generally well known in the art and will not be otherwise described in detail. An exemplary discussion of photodetectors is, however, set forth in Dorf, *The Electrical Engineering Handbook,* including Section 31.2 ("Sources and Detectors") at page 811 ff, Sections 56.1 and 56.2 ("Physical Sensors") at page 1255ff, and "Photodiodes and Solar Cells" at page 524. The detectors are also relatively small, particularly when compared to the overall device 20. Thus, in FIG. 1 the photodetectors will be identified by position rather than as discrete illustrated elements. A first detector is positioned at location 25 adjacent the entry portion of the apparatus 20 and counts individual corrugated boxes as they are fed into a bundle at the squaring station 21. A second detector is positioned at location 26 along the conveyer 22 for identifying the presence of a bundle B on the conveyer 22. A third detector is positioned at location 27 the downstream end of the conveyer 22 for identifying the movement of a leading or trailing edge of a bundle B past the third detector. A fourth detector is positioned at location 30 at the upper range of movement of the lift 23 for identifying the movement of the top of a bundle B as the lift 23 lowers. Finally, a fifth detector, whose position at location 31 is at best illustrated in FIG. 9, is positioned adjacent the exit conveyer 24 for identifying the discharge of a stack from the exit conveyer.

Other elements of the apparatus 20 and the method in which it is used are best understood by a description of the operating sequence which is illustrated by FIGS. 1–10.

In a most typical setup, the apparatus 20 receives folded boxes from a folder-gluer. Folder-gluers are well known to those of ordinary skill in these arts and will not be described in detail other than to note that they typically receive an unfolded corrugated blank, often last handled by a printer-slotter, a device that prints, scores, and cuts the flat corrugated blank into a desired pre-box pattern. When such blanks are delivered to a folder-gluer, the folder-gluer adds the desired folds to the blank, applies a strip of glue, and folds a portion of the blank onto itself to form a flat, folded, and glued box precursor. For the sake of convenience, such precursor structures will often be referred to herein simply as "boxes."

The apparatus of the present invention can be integrated to receive individual boxes directly from a folder-gluer or can operate in a stand-alone fashion with flat folded boxes being delivered other than directly from the folder-gluer. A plurality of belts designated together at 32 in FIGS. 1 and 2 pull individual boxes into the squaring section 21 which is also referred to as the "hopper." As the boxes enter the squaring station 21, the first detector at location 25 counts them. Using an appropriate control system, a user can enter a preselected number of boxes into the control system and thereby define the number of boxes that will make up a single bundle B. Accordingly, when the count from the photodetector at location 25 indicates that the preselected number of boxes have arrived in the squaring section, the controller activates a kicker 33 operatively associated with the first detector at location 25 for pushing a bundle B from the squaring station 21 to the conveyer 22.

Control systems such as those useful with the present invention are well known in this and other arts, and will not be discussed otherwise in detail. General explanations and exemplary systems are set forth in numerous reference sources, including Dorf, supra, at page 1104 ("Control Circuits"), page 1255 ("Sensors"), and page 2257 ("Control Systems").

Figure 2:
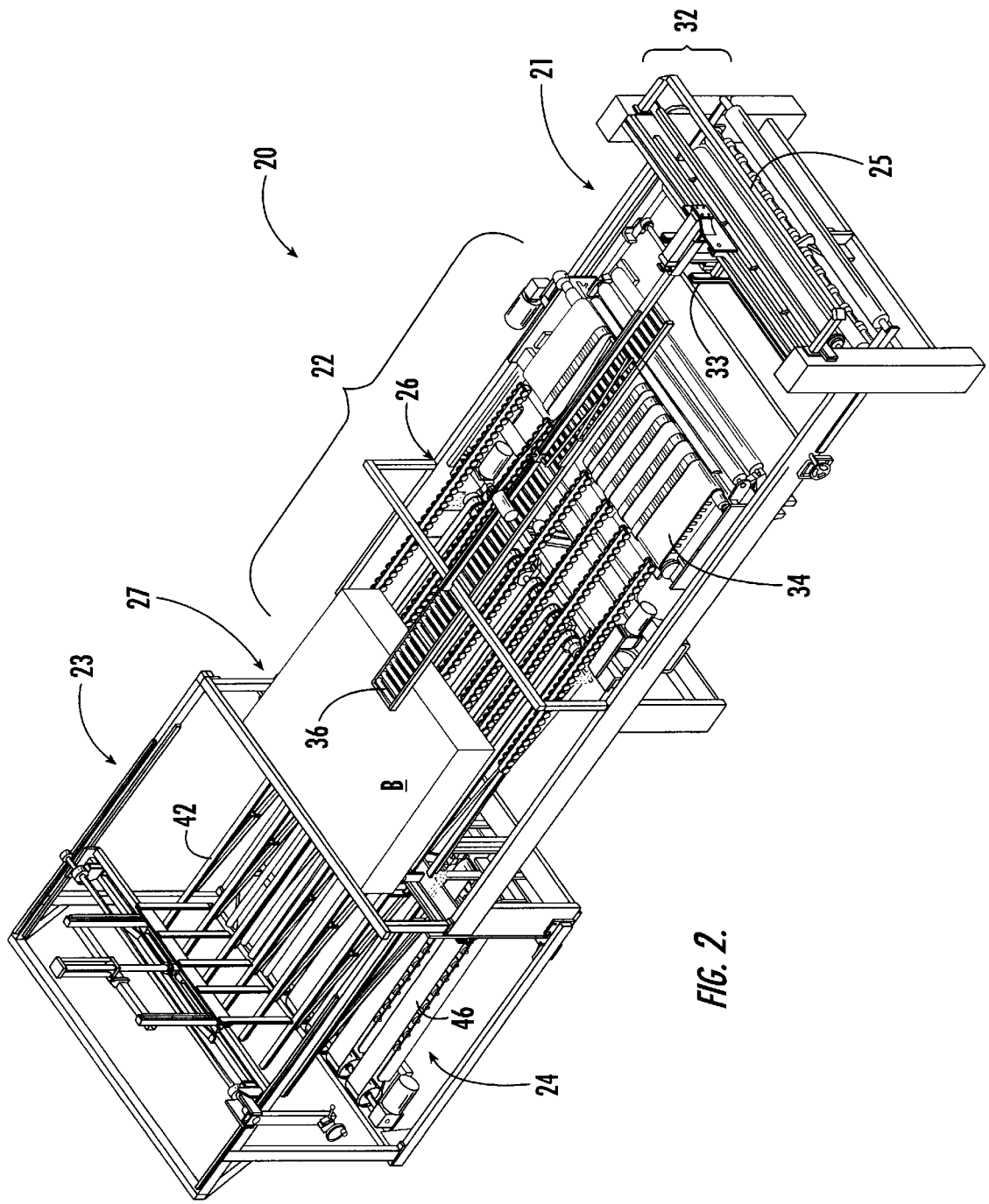
FIG. 2 is a perspective view similar to FIG. 1 illustrating a bundle of box blanks in a different position.

In the embodiment illustrated in FIGS. 1 and 2, the bundle B first reaches a plurality of "buggy" belts 34 while at the same time moving underneath an adjustable compression section broadly designated at 35. In the illustrated embodiment, the compression section comprises a roller conveyer 36 that is vertically adjustable using the scissor mechanism 37. As a result, the height of the roller conveyer 36 places a desired amount of compression on a bundle B with a defined number of boxes.

The capability to automatically bundle boxes and then stack bundles while concurrently holding the glue under compression, is a particular advantage of the invention.

As the buggy belts 34 advance the bundle B (from right to left in the orientation of FIGS. 1 and 2), the bundle breaks the second photodetector at location 26. The second detector is operatively associated with the conveyer 22 to selectively drive the conveyer 22 when a bundle B is positioned thereon. In the preferred embodiments, this portion of the conveyer 22 is formed of a plurality of stacker belts 40.

Because the second photodetector at location 26 identifies the presence of a bundle B on the stacker belts 40, it also can be used to signal the apparatus controller to refrain from forwarding another bundle until an initial bundle B has cleared the stacker belts 40.

The stacker belts 40 advance the bundle B towards the lift 23. The bundle B next reaches the third photodetector at location 27 (e.g., FIG. 3). The third photodetector at location 27 is operatively associated with a plurality of parallel reciprocating bayonets 41 that can successively deliver the bundle B from the downstream end of the stacker belts 40 to the lift 23. Specifically, the third detector at location 27 is operatively associated with the reciprocating bayonets 41 to extend the bayonets 41 to receive a bundle when a bundle reaches the downstream end of the conveyer 22. This orientation is best illustrated in FIG. 3 in which the bundle B has reached the downstream end of the stacker belts 40 and the third photodetector at location 27 has triggered the bayonets 41 to extend from, and in the direction parallel to, the downstream end of the stacker belts 40 at a speed relatively close to the speed of the stacker belts 40.

Figure 3:
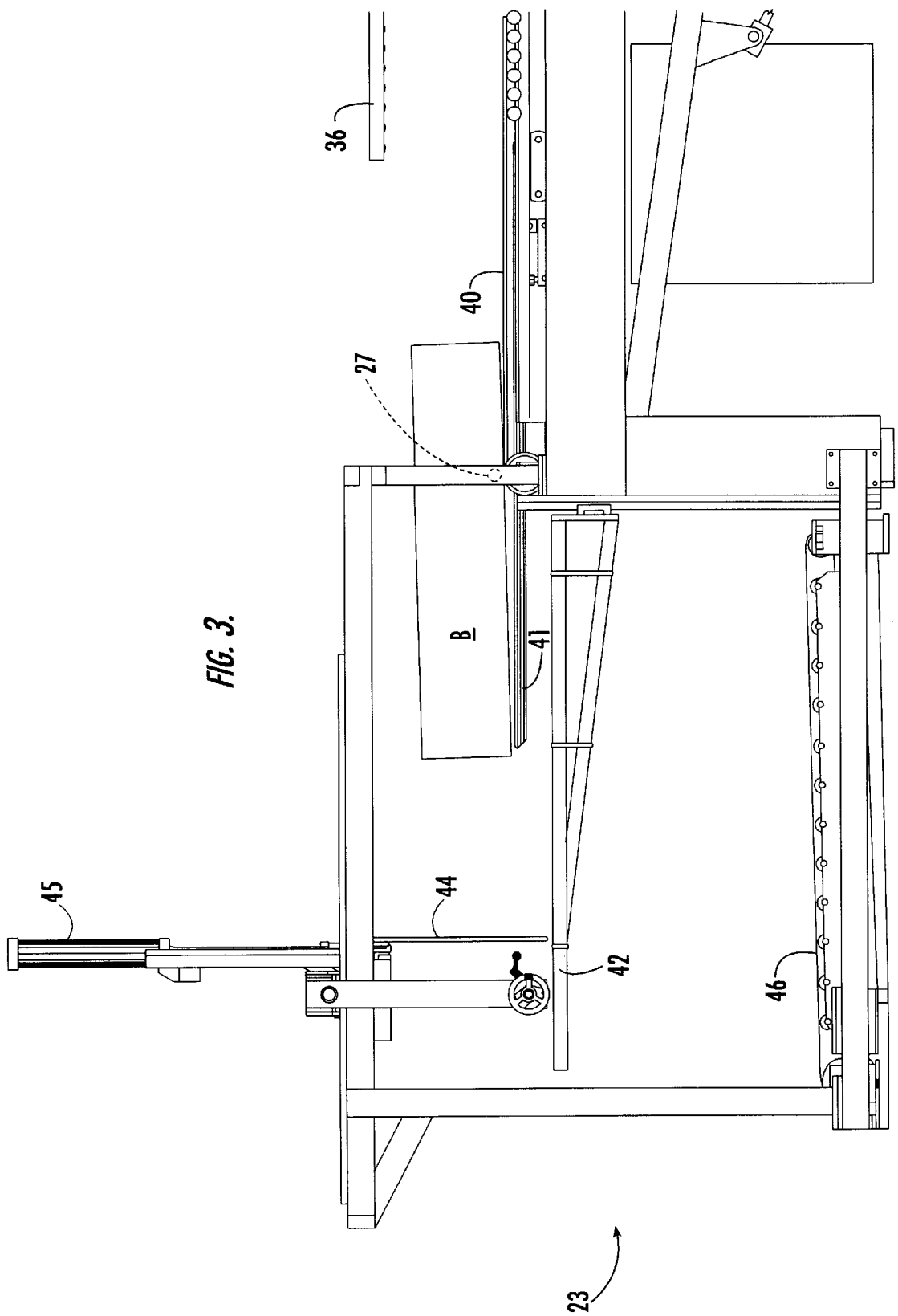
FIG. 3 is a side elevational view taken along elevation line A—A of FIG. 1 and showing the progression of a bundle through the apparatus of the invention.

FIG. 3 further illustrates that the bundle B is transferred from the stacker belts 40 onto the bayonets 41 as the bayonets are extending from the downstream end of the stacker belts 40 with the bayonets 41 supporting the leading edge of the bundle. The stacker belts 40 continue to transport the bundle until the bundle clears the third photodetector at location 27 (which is blocked by the bundle B in FIG. 3).

FIGS. 1, 2, and 3 also illustrate that the lift 23 is preferably formed of a plurality of arms 42 that are raised and lowered together by an appropriate mechanism, the details of which are not specific to the invention, that are known to or easily designed by those of ordinary skill in these arts, and that will not be otherwise discussed in detail. As perhaps best illustrated by FIGS. 1 and 2, however, in preferred embodiments the respective positions of the stacker belts 40, bayonets 41 and lift arms 42 complement one another so that the operations of each can be carried out without interference from the structure or positions of the others. More specifically, when the bayonets 41 are retracted, they are positioned between alternating stacker belts 40 and when the bayonets 41 are extended, their positions fall between those of adjacent lift arms 42.

Figure 4:
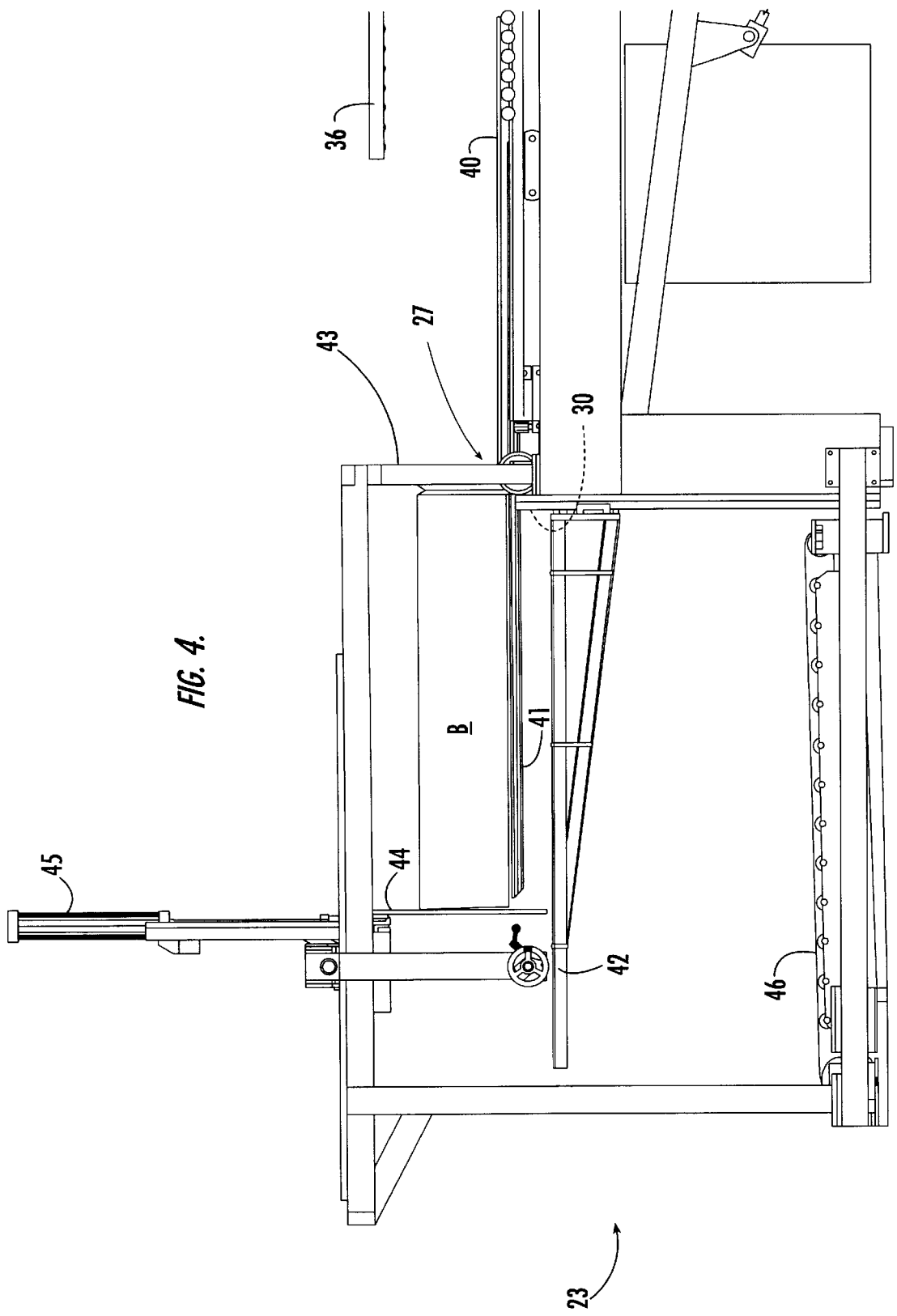
FIGS. 4–6 are taken along the same side elevation as FIG. 3 and show the progression of the first bundle of boxes through the apparatus of the invention.

FIG. 4 illustrates the next step in the sequence which occurs when the trailing edge of the bundle B clears the third photodetector at location 27. At this point, the stacker belts 40 turn off and a gate 43 raises up behind the trailing edge of the bundle B. Thus, at the point in the sequence illustrated by FIG. 4, the bundle B is completely off of the stacker belts 40, and is completely supported by the bayonets 41 and above the lift arms 42 of the lift 23.

Figure 5:
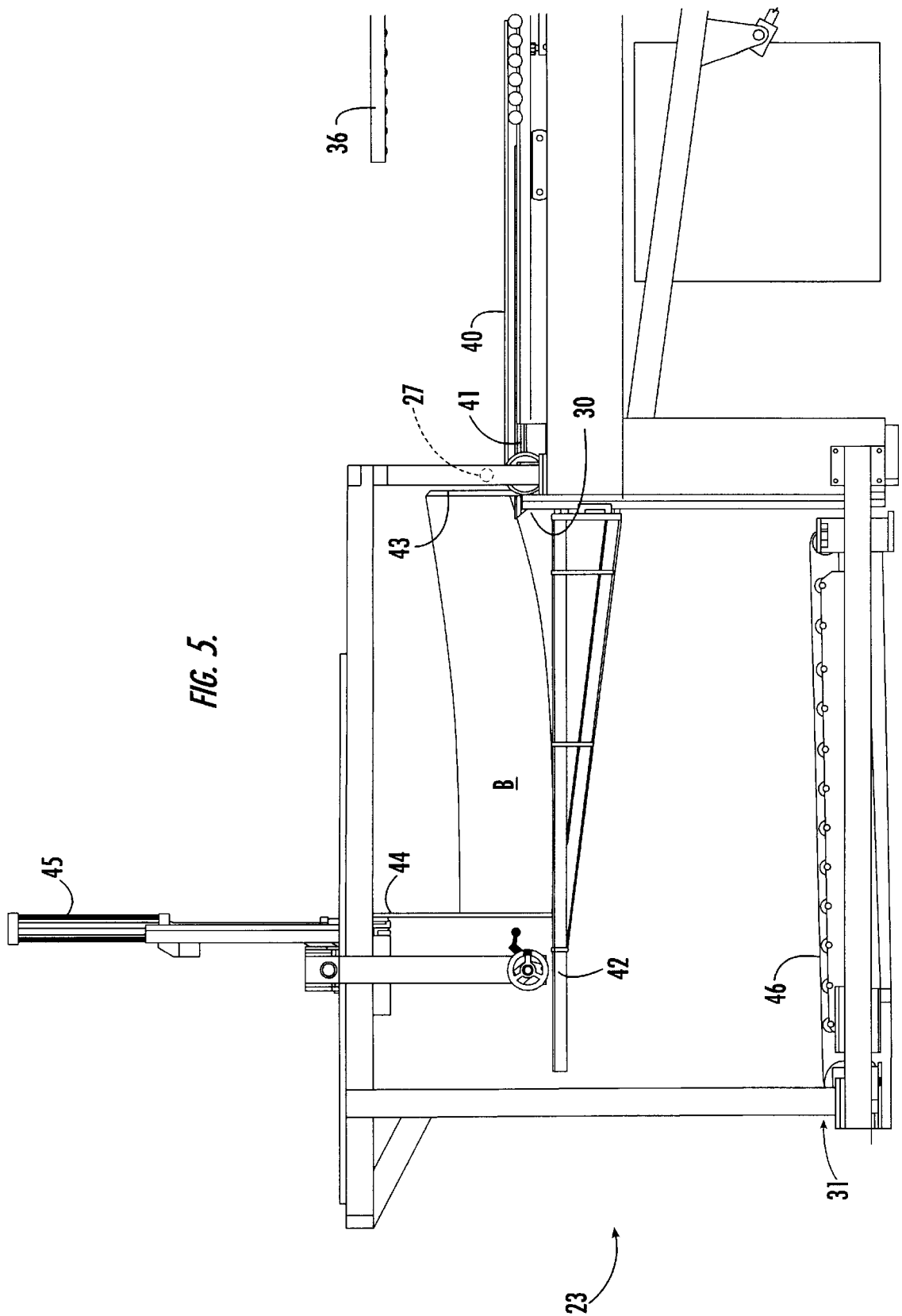

FIG. 5 illustrates that after a predetermined period of time has elapsed to allow the gate 43 to be raised, the bayonets 41 retract and effectively lower the bundle B to the lift arms 42. In this position, the bundle B actuates the fourth photodetector at location 30 which causes the lift arms 42 to lower until the fourth photodetector at location 30 has been cleared (FIG. 6).

FIGS. 3–6 also illustrate that the signal from the third photodetector at location 27 that raises the gate 43 similarly lowers a backstop 44 that is mechanically controlled by any suitable device and which in the illustrations comprises a cylinder 45. It will thus be understood that the gate 43 and the backstop 44 hold the bundle in position and in a squared orientation during the stacking process.

Figure 6:
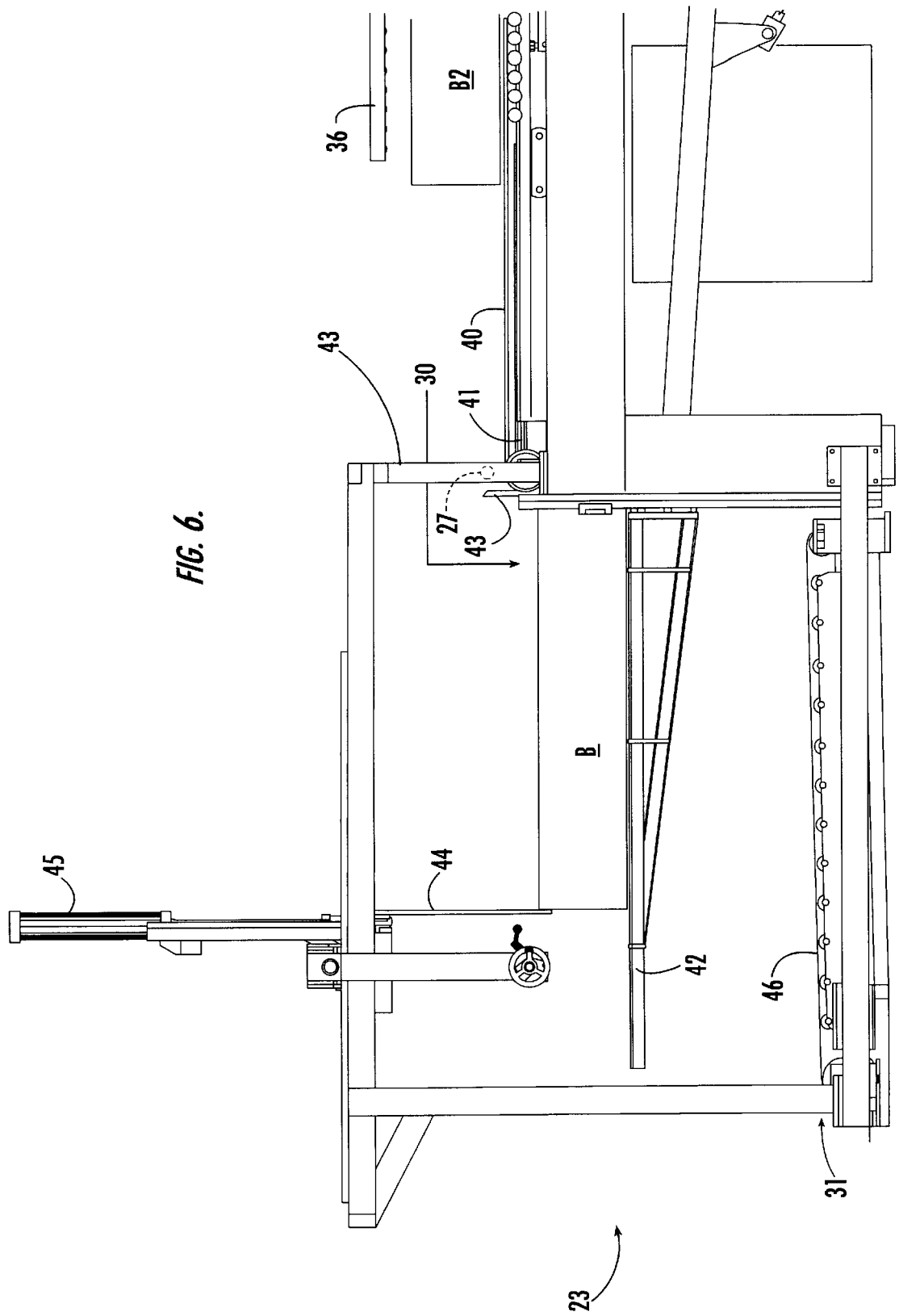

Returning to the step illustrated in FIG. 6, the retraction of the bayonets 41 triggers the gate 43 to lower and send a count to an appropriate controller. Furthermore, as the lift arms 42 descend sufficiently, the top of the bundle B breaks the photodetector 30 a second time which in turn triggers the stacker belts 40 to restart and carry the next succeeding bundle (designated B2 in FIG. 6) to the stack being formed on the lift arms 42.

Figure 7:
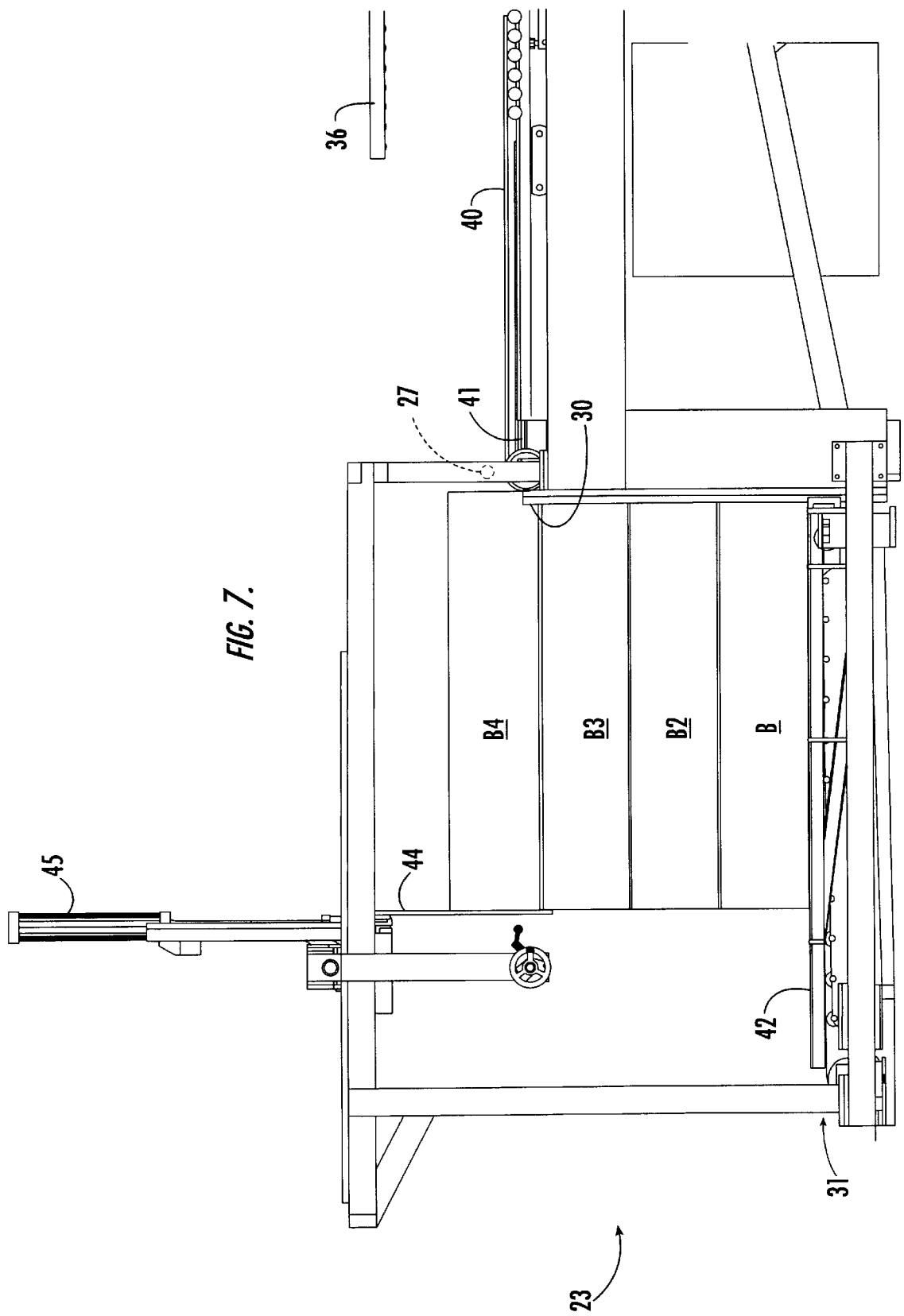
FIGS. 7–9 are taken along the same elevation as FIGS. 3–6 and illustrate a plurality of bundles being handled by the apparatus of the present invention.
Figure 8:
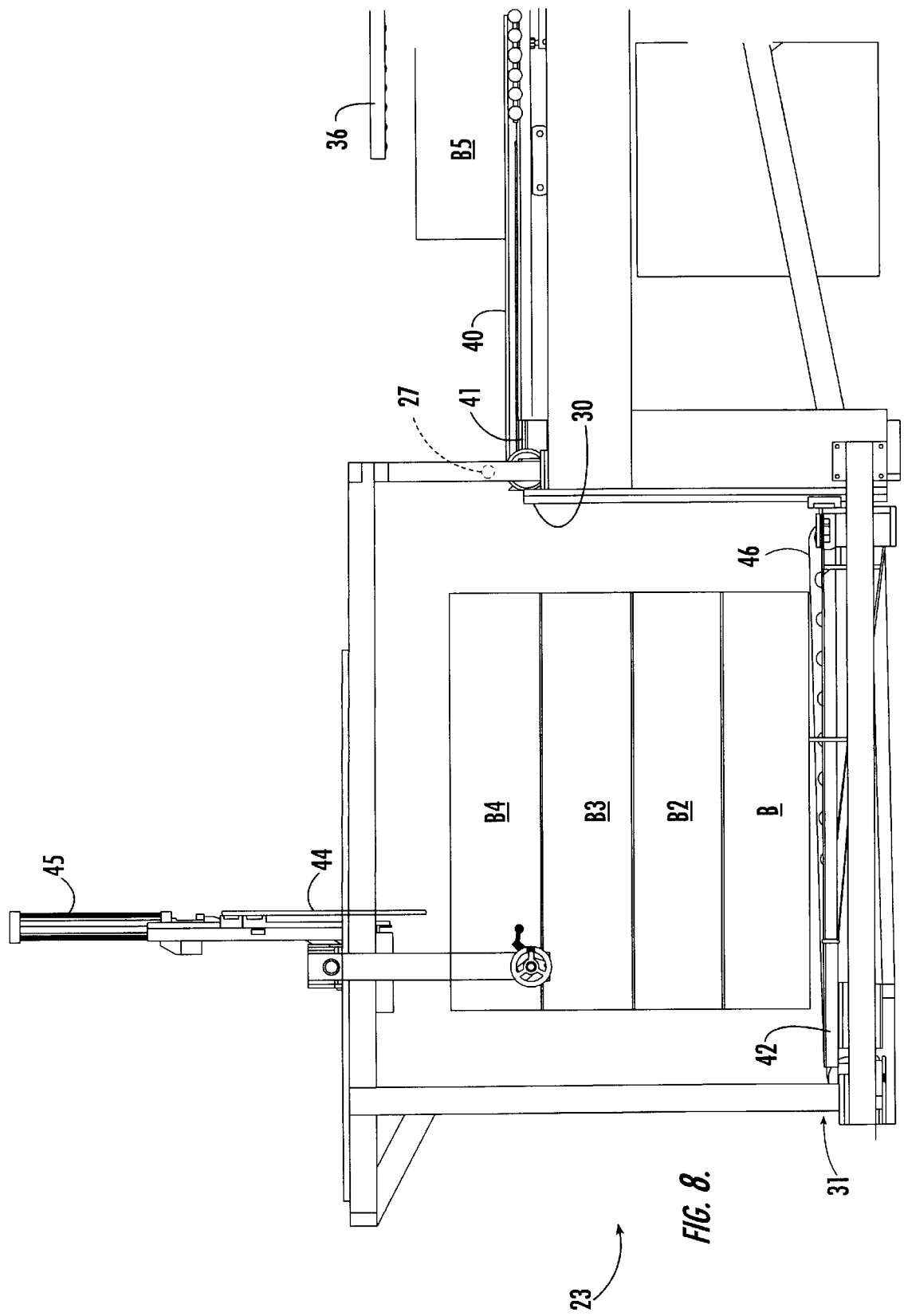

Using an appropriate controller, the apparatus thus keeps track of the number of bundles making up a stack. Accordingly, FIG. 7 illustrates that when the last bundle (B4) has been placed on the lift arms 42, and the bayonets 41 fully retracted, the lift arms descend to their bottom limit (FIG. 8) and the backstop 44 raises to allow the stack of bundles to exit the apparatus. As this takes place, the stacker belts 40 are stopped to prevent another bundle B5 from entering. As again perhaps best illustrated in FIGS. 1 and 2, the exit conveyer 24 is made up of a plurality of conveyer belts 46 that transport the stack out of the apparatus 20 and to the remainder of the plant conveyer system. In FIGS. 1–10, the exit conveyers 46 are illustrated as delivering the stack in a direction parallel to the movement of bundles through the apparatus 20. Nevertheless, it will be understood that the exit conveyers can be arranged to move in the parallel direction, or to the left or to the right of the parallel direction, to deliver the stack as desired within the layout of a particular plant or series of related machines.

FIG. 9 illustrates that as the stack exits the lift 23 it breaks the fifth photodetector at location 31 which informs the controller that the stack is exiting. When the stack completely clears the fifth photodetector at location 31, the next bundle B5 is advanced from the stacker belts 40 onto the bayonets 41 and thereafter the lift arms 42, as part of the sequence of operation just described.

It will be understood that although FIGS. 3–9 illustrate a stack formed of four bundles, such is for illustration purposes only. The number of bundles in a stack can be selected by the user, as can the number of folded glued boxes in a bundle. Similarly, the "container-sized" stacks shown in the drawings is illustrative, rather than limiting, of the features of the invention.

FIG. 10 illustrates an optional feature of the invention and the associated method. After the stack has cleared the fifth photodetector at location 31, the lift arms 42 can be preprogrammed to rise to a particular height at which an operator can place a "bottom sheet" if necessary or desired. If the operator chooses this option, he must proactively signal the lift to continue raising after he has placed the bottom sheets. In this embodiment, the bayonets 41 are operatively associated with the position of the lift arms 42 to prevent the bayonets from retracting until the lift arms 42 are in their full "up" position.

In another aspect, the invention comprises a method of making and stacking bundles of corrugated folded glued boxes into accurate loads. In this aspect, the method comprises counting and squaring a first discrete bundle of a predetermined number of folded glued boxes, advancing the squared first bundle along a conveyer to a position above a lift; lowering the squared first discrete bundle from the conveyer onto the upper surface of the lift (which can be the top of a previous discrete bundle) while maintaining the bundle in its squared orientation. Preferably, all of the boxes in a bundle have the same orientation with respect to their glue strips and folds. A succeeding discrete bundle of folded glued boxes is then squared while the first bundle is on the conveyer or the lift. The succeeding bundle is then advanced along the conveyer to the position above the lift, lowered onto the top of the first bundle while maintaining the succeeding bundle in its squared orientation and while orienting the succeeding bundle to match the first bundle on the lift to form an aligned stack of both bundles. Thereafter, the aligned stack is discharged from the lift.

As noted with respect to the apparatus aspects of the invention, the method can further comprise compressing the bundle with a perpendicular force that assists in gluing as the bundle advances toward the lift. Most preferably, the step of advancing any bundle takes place after a preselected number of folded boxes have been counted, added to the bundle, and squared. As further illustrated in the drawings and described with respect to the apparatus, in the most preferred embodiments the method comprises squaring and thereafter lowering a plurality of succeeding bundles onto the first bundle to form an aligned stack. The number of bundles in an aligned stack is preferably counted and the stack discharged from the lift when a preselected number of bundles have been counted.

The apparatus and associated method provide a number of specific advantages. The apparatus and method can produce a counted but unfastened stack of boxes. The invention and apparatus require no particular cycle time and can run as fast as the machines preceding it and following it. Thus, the invention avoids becoming the slowest step in the box-making process and instead can operate as quickly as the fastest step.

A tying machine is an optional addition and can be used just prior to placing the bundles on the hydraulic lift, but is not necessary to the operation of the invention.

Because the invention provides automatic and bundled stacking, it enables squaring of the individual sheets and a technique for holding the glue sheet under compression. Furthermore, each substack is square as well as the overall stack and the stack is kept square as it is loaded on the hydraulic lift. As a result, the glued joint of the box is improved because of the compression applied during the method and by the apparatus of the invention.

In the drawings and specification, there have been disclosed typical embodiments of the invention, and, although specific terms have been employed, they have been used in a generic and descriptive sense only and not for purposes of limitation, the scope of the invention being set forth in the following claims.

That which is claimed is:

1. A method of making and stacking bundles of corrugated folded boxes into accurate loads, the method comprising:

squaring a first discrete bundle of folded glued boxes;

advancing the squared first bundle along a conveyor, while applying a compressive force to the first bundle, to a position above a lift;

lowering the squared first discrete bundle from the conveyor onto the upper surface of the lift while maintaining the bundle in its squared orientation;

squaring a succeeding discrete bundle of folded glued boxes while the first bundle is on the conveyor or the lift;

advancing the succeeding bundle along the conveyor, while applying a compressive force to the succeeding bundle, to the position above the lift;

lowering the succeeding bundle onto the top of the first bundle while maintaining the succeeding bundle in its squared orientation and while orienting the succeeding bundle to match the first bundle while the first bundle is on the lift to form an aligned stack of both bundles; and discharging the aligned stack from the lift.

2. A method according to claim 1 wherein the step of advancing the squared bundle further comprises compressing the bundle as the bundle advances towards the lift.

3. A method according to claim 1 and further comprising the step of counting the boxes in the first and succeeding bundles before the steps of squaring and lowering the bundles.

4. A method according to claim 3 comprising advancing the bundle after a preselected number of folded boxes have been counted, added to the bundle, and squared.

5. A method according to claim 1 and further comprising squaring and lowering a plurality of succeeding bundles on the first bundle to form the aligned stack.

6. A method according to claim 5 and further comprising counting the number of bundles in the aligned stack.

7. A method according to claim 5 wherein the step of discharging the aligned stack from the lift comprises discharging a stack when a preselected number of bundles have been counted.

8. A method of making and stacking bundles of corrugated folded boxes into accurate loads, the method comprising:

advancing a squared bundle of flattened folded glued corrugated boxes along a conveyor while applying a compressing force to the bundle in a direction that bears against the glued portions of the boxes in the bundle;

lowering the squared first discrete bundle from the conveyor onto the upper surface of a lift while maintaining the bundle in its squared orientation;

squaring a succeeding discrete bundle of folded glued boxes while the first bundle is on the conveyor or the lift;

advancing a succeeding squared bundle along the conveyor to the position above the lift while applying the compressing force to the bundle;

lowering the succeeding bundle onto the top of the first bundle while maintaining the succeeding bundle in its squared orientation and while orienting the succeeding bundle to match the first bundle while the first bundle is on the lift to form an aligned stack of both bundles; and discharging the aligned stack from the lift.

9. A method according to claim 8 wherein the step of advancing the bundle comprises advancing the bundle with each of the boxes in an identical orientation.

10. A method according to claim 8 and further comprising the step of counting the boxes in the first and succeeding bundles before the steps of squaring and lowering the bundles, and advancing the bundles after a preselected number of folded boxes have been counted, added to the bundle, and squared.

11. A method according to claim 8 and further comprising squaring and lowering a plurality of succeeding bundles on the first bundle to form the aligned stack.

12. A method according to claim 11 and further comprising counting the number of bundles in the aligned stack, and discharging the aligned stack from the lift when a preselected number of bundles have been counted.

13. An apparatus for automated bundling and stacking of corrugated folded boxes, and comprising:

a squaring station for receiving individual folded corrugated boxes and squaring the boxes into a bundle;

a conveyor for advancing a squared bundle of folded boxes from said squaring station;

means for applying a compressing force to the glued boxes in a bundle while the bundle advances on said conveyor;

a lift adjacent said conveyor for successively receiving squared bundles from said conveyor;

means for delivering a squared bundle from said conveyor to said lift positioned below the plane of said conveyor;

an exit conveyor for discharging a stack of bundles from said lift.

14. An apparatus according to claim 13 wherein said squaring station further comprises a first detector for counting the number of boxes in a bundle.

15. An apparatus according to claim 14 and further comprising a kicker for pushing a bundle from said squaring station to said conveyor when the counter counts a selected number of boxes in the bundle.

16. An apparatus according to claim 13 comprising a second detector for identifying the presence of a bundle on said conveyor.

17. An apparatus according to claim 13 comprising a third detector at the terminal end of said conveyor for identifying the leading and trailing edges of a bundle as a bundle moves from said conveyor to said delivery means.

18. An apparatus according to claim 17 wherein said delivery means comprises a plurality of reciprocating bayonets coplanar with said conveyor.

19. An apparatus according to claim 18 wherein said bayonets reciprocate between a retracted position wherein said bayonets do not substantially extend beyond the terminal end of said conveyor and an extended position wherein said bayonets extend beyond said terminal end of said conveyor to a position above said lift.

20. An apparatus according to claim 19 wherein said third detector is operatively associated with said reciprocating bayonets and wherein said bayonets begin to extend from their retracted position whenever the leading edge of a bundle passes said third detector.

21. An apparatus according to claim 13 comprising means for maintaining the bundle in a squared orientation as the bundle is transferred from the conveyor to the lift.

22. An apparatus according to claim 21 wherein said maintaining means comprises a vertically moveable gate positioned between said conveyor and said delivery means and a vertically moveable backstop for maintaining a bundle in position as said delivery means transfers the bundle from said conveyor to said lift.

23. An apparatus according to claim 13 wherein said compressing means comprises a conveyor parallel to and above said advancing conveyor.

24. An apparatus according to claim 23 wherein said compressing conveyor is vertically adjustable to complement the size of the bundle and to adjust the compressing force applied to the bundle.

25. An apparatus for automated bundling and stacking of corrugated folded boxes, and comprising:
- a squaring station for receiving individual folded corrugated boxes and squaring the boxes into a bundle;
- a first detector adjacent said squaring station for counting the corrugated boxes as they are squared into a bundle;
- a conveyor with its upstream end adjacent said squaring station for advancing a squared bundle of folded boxes downstream from said squaring station;
- means for applying a compressing force to the glued boxes in a bundle while the bundle advances on said conveyor;
- a second detector near the upstream end of said conveyor for identifying the presence of a bundle on said conveyor;
- a lift adjacent the downstream end of said conveyor for successively receiving squared bundles from said conveyor;
- a plurality of parallel reciprocating bayonets for successively delivering a squared bundle from the downstream end of said conveyor to said lift;
- a third detector at the downstream end of said conveyor for identifying the movement of a leading or trailing edge of a bundle past said detector;
- a fourth detector at said lift for identifying the movement of the top of a bundle as said lift lowers;
- an exit conveyor for discharging a stack of bundles from said lift; and
- a fifth detector adjacent said exit conveyor for identifying the discharge of a stack from said exit conveyor.

26. An apparatus according to claim 25 and further comprising a kicker operatively associated with said first detector for pushing a bundle from said squaring station to said conveyor when a selected number of boxes have been counted and added to said bundle.

27. An apparatus according to claim 25 wherein said second detector is operatively associated with said conveyor to drive said conveyor when a bundle is positioned thereon.

28. An apparatus according to claim 25 wherein said third detector is operatively associated with said bayonets to extend said bayonets to receive a bundle when a bundle reaches the downstream end of said conveyor.

29. An apparatus according to claim 25 and further comprising a vertically moveable gate at the downstream end of said conveyor and a vertically moveable backstop adjacent the extended position of said bayonets for maintaining a bundle in squared alignment as the bundle is delivered from said conveyor to said lift.

30. An apparatus according to claim 29 wherein said gate and backstop are also operatively associated with said third detector to align a bundle after the bundle is delivered from the downstream end of said conveyor.

31. An apparatus according to claim 25 wherein said fourth detector is operatively associated with said conveyor and said bayonets for permitting a succeeding bundle to move along said conveyor when said lift has lowered enough for a bundle thereon to clear said fourth detector.

32. An apparatus according to claim 25 wherein said compressing means comprises a conveyor parallel to and above said advancing conveyor.

33. An apparatus according to claim 32 wherein said compressing conveyor is vertically adjustable to complement the size of the bundle and to adjust the compressing force applied to the bundle.

34. An apparatus according to claim 25 wherein said detectors are selected from the group consisting of photodetectors and proximity detectors.

* * * * *